(12) United States Patent
Bodor et al.

(10) Patent No.: US 7,455,866 B2
(45) Date of Patent: Nov. 25, 2008

(54) PROCESS FOR PRESERVING ROASTED VEGETABLES

(75) Inventors: Janos Bodor, Vlaardingen (NL); Hubertus Cornelis Van Gastel, Vlaardingen (NL)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 450 days.

(21) Appl. No.: 10/353,534

(22) Filed: Jan. 29, 2003

(65) Prior Publication Data

US 2003/0148009 A1 Aug. 7, 2003

(30) Foreign Application Priority Data

Feb. 1, 2002 (EP) .................. 02075452

(51) Int. Cl.
*A23L 3/34* (2006.01)
(52) U.S. Cl. ............... 426/321; 426/542; 426/615; 426/654
(58) Field of Classification Search ........... 426/321, 426/531, 541, 542, 615, 654
See application file for complete search history.

(56) References Cited

U.S. PATENT DOCUMENTS

| 3,138,464 | A | 6/1964 | Kruse |
| 5,925,395 | A | 7/1999 | Chen |
| 6,180,145 | B1 | 1/2001 | Ricks |
| 6,824,802 | B2 * | 11/2004 | Bautista et al. ............. 426/335 |

FOREIGN PATENT DOCUMENTS

| EP | 1329164 | | 7/2003 |
| GB | 1 274 385 | A | 5/1972 |
| WO | 96/14760 | | 5/1996 |
| WO | 00/62627 | A | 10/2000 |
| WO | 02/096207 | | 12/2002 |

OTHER PUBLICATIONS

Applicant: Van Heetvelde et al., U.S. Appl. No. 10/174,146, filed Jun. 18, 2002.
International Search Report claiming priority of PCT/EP 03/00289 completed May 22, 2003.
Patent Abstract of Japan, vol. 016, No. 183; (1992) & JP 04 023948 A.
Patent Abstract of Japan, vol. 1998, No. 06; (1998) & JP 10 0427818 A.
Patent Abstract of Japan, vol. 015, No. 128; (19912) & JP 03 010655 A.
Patent Abstract of Japan, vol. 007, No. 219; (1983) & JP 58 116649 A.

* cited by examiner

*Primary Examiner*—Leslie Wong
(74) *Attorney, Agent, or Firm*—Michael P. Aronson

(57) ABSTRACT

A method for preserving vegetables comprising the steps:
  subjecting the vegetables to a heat treatment chosen from the group consisting of: roasting, shallow frying, baking and grilling,
  immersing the heat-treated vegetables in a preserving liquid,
  storing the vegetables in the preserving liquid until use, characterized in that the preserving liquid is an aqueous solution containing a preservative agent, a antioxidant, 0.1-4.0 wt. % of salt and such amount of an edible acid that the pH of the liquid after 48 hours of equilibration with the immersed vegetables is in the range 4.1-4.5.

6 Claims, No Drawings

PROCESS FOR PRESERVING ROASTED VEGETABLES

FIELD OF THE INVENTION

The present invention relates to a method for preserving heat-treated vegetables, particularly vegetables used in the preparation of sandwiches. Taste and appearance of the vegetables can be preserved for up to 4 weeks.

BACKGROUND OF THE INVENTION

Vegetables may be subjected to a heat treatment prior to consumption or further processing. Roasted vegetables are used as ingredients for some types of ready-to-eat packed sandwiches which have a shelf life of several days. Roasting, however, by damaging the cell structure makes heat-treated vegetables prone to shrinking and discolouration which limits their storage time. Microbial spoilage of the vegetable matter in the period between agricultural production and consumption of the sandwich is another concern. It would be convenient when the roasted vegetables could obtain an extended storage time during which their good taste and appearance could be retained and microbiological safety could be ensured.

Many methods are known in the art that extend the closed shelf life of vegetables. These methods mainly comprise storing the vegetables in preserving liquids. These liquids contain relatively high levels of salt and/or are very sour. This has a severe and adverse impact on the taste of the vegetables. While a salty or sour taste is quite normal for pickled vegetables, it is not acceptable for the heat-treated, particularly the roasted sandwich vegetables, which should have a rather mild taste. The use of those salty or sour preserving liquids may allow a one year preservation time, but the taste of the preserved heat-treated vegetables has been deteriorated and is much different from the taste of freshly roasted or grilled vegetables.

U.S. Pat. No. 5,925,395 describes methods for preserving fresh vegetables wherein fresh vegetables are cut and exposed to a preserving aqueous solution comprising 0.1-10 wt. % of calcium ions and 0.1-30 wt. % of ascorbate ions or erythorbate ions. Storage without losing fresh taste, appearance and crispiness is claimed for up to 10 days. This method relates to vegetables that apart from being cut have not been further processed, anyway have not been roasted or otherwise heated.

The fresh vegetables described in WO96/14760 are kept in a film, which contains a marinating agent, comprising vinegar, sugar, salt, flavourings and others. This method does not relate to vegetables that have been heat-treated.

Roasted vegetables belong to the ingredients of certain food products, especially packed ready-to-eat sandwiches. For this application the heat-treated vegetables need an extended shelf-life during which their appearance and taste are closely resembling the appearance and taste of freshly heat-treated vegetables.

SUMMARY OF THE INVENTION

The present invention relates to a method as defined in claim 1 for preserving the typical taste and appearance of freshly heat-treated vegetables.

The invention also relates to a composition comprising heat-treated vegetables and a preserving liquid.

DETAILED DESCRIPTION OF THE INVENTION

The present invention pertains to a method of preserving the taste and appearance of heat-treated vegetables.

In the context of the present specification vegetables are understood to comprise also the mushrooms and the fruits which are suited for the heat treatments as described below. Suitable vegetables for use in the invention are for example, peppers, courgettes, aubergines, carrots, mushrooms and/or members of the botanical family of Allium such as onions or garlic. Preferred vegetables are courgettes, aubergines and peppers, preferably sweet peppers.

After an optional washing step the vegetables are cut into pieces, slices or rings, preferably with a thickness of 0.4-1.5 cm, more preferably 0.5-1.0 cm and before heating optionally treated with an edible oil such as for example olive oil, sunflower oil or nut oil.

Heat-treatment is meant to comprise any process for heating above 100° C. but excluding cooking in steam or water. The aim of the heat treatment is to give the vegetables an attractive taste and appearance. The heating process is chosen from the group consisting of shallow frying, deep frying, roasting, IR heating, UV heating and baking or grilling in hot air. Roasting, grilling, baking and shallow frying are preferred. The skilled man is familiar with those treatments and with the necessary equipment.

Temperature and time of heating usually varies with the vegetables and the type of heat-treatment. But the skilled man is able to select suitable temperatures and cooking times for obtaining the desired taste and appearance.

The preserving liquid is an aqueous solution containing a preservative agent, an antioxidant, cooking salt and such amount of an edible acid that the pH of the liquid after immersing of the vegetables and equilibration during two days is in the range 4.1-4.5, preferably 4.2-4.4, more preferably 4.3-4.4. The amount of cooking salt is 0.1-4.0 wt. %, preferably 0.5-3.0 wt. %, more preferably 1.5-2.5 wt. %. NaCl and/or KCl are used as cooking salt.

The specific amount of edible acid depends on the type of acid and the type of vegetable actually used. Suitable acids comprise the foodgrade acids phosphoric acid, lactic acid and citric acid, but preferably acetic acid in the form of vinegar is used.

Some trials may be necessary to find out what amount of acid has to be present in the preserving liquid to ensure the claimed pH after the 48 hours equilibration period.

The heat-treated vegetables are contacted with the preserving liquid also denoted as marinade by immersing. Immersion takes place preferably after completion of the heating so that the ensuing cooling immediately stops the cooking of the vegetables. For that reason the marinade has a temperature which preferably is less than 30° C., but, obviously, is above its freezing point. After immersion the vegetables are packed with the preserving liquid into a container preferably into polyethylene bags, which after sealing are stored under cooling.

Preferably the preserving liquid is applied in a weight ratio vegetables/preserving liquid chosen from the range 1:1 to 1:2, more preferably 1:1.4 to 1:1.8.

A method has been found with which vegetables can be preserved for at least several days up to four weeks of cooled storage.

The heat-treated vegetables when immersed in the marinade and used for filling sandwiches does not show any quality loss during subsequent storage of the prepared sandwiches for several days. With respect to taste and appearance the vegetables closely resemble freshly heat-treated vegetables. These qualities are retained even up to 4 weeks, preferably up to 2 weeks when stored with the marinade and preferably at a temperature in the range 2°-12° C. This extended storage facilitates the sourcing of roasted vegetables for packed sandwiches production. Daily preparation can be substituted by twice-a-month production.

For storage any suitable container can be used, preferably a container that ensures minimal air entrapment such as heat-sealable plastic bags, preferably polyethylene bags.

Preservative agents are those well known in the art of food manufacture. Preferred preservatives are sorbic acid, benzoic acid and their edible salts.

Antioxidants are those well known in the art of food manufacture. The preferred antioxidant is ascorbic acid.

The preserving liquid optionally comprises up to 10 wt. % of an agent that reduces the perception of acidity. A preferred agent is a sweetener such as a sugar, for example a mono-, di- or trisaccharide.

Optionally the preserving liquid further comprises flavouring agents, herbs, spices and a water-structuring agent. Water-structuring agents comprise hydrocolloids, starch or starch derivatives, gums, such as gum arabic, xanthan gum, agar gum, pectin and gelatin.

The step of contacting the heat-treated vegetables with the preserving liquid comprises, besides immersing, also dipping and soaking in or spraying with the preserving liquid. The aim is to accomplish an intensive contact by moisturing the heated vegetables with the preserving liquid. For actual storage, however, immersing is by far the most efficient and effective option.

When the stored vegetables need to be used, the preserving liquid can be easily removed by for example centrifugation or separating by a sieve. After storage the heat-treated vegetables show a taste which greatly resembles the taste of vegetables immediately after heat treatment.

The invention also relates to a composition comprising heat-treated vegetables packed together with a preserving liquid as defined in the claims.

EXAMPLE

Preservation of Roasted Aubergines

A marinade was prepared by mixing the ingredients from Table I.

TABLE I

| Ingredient | wt % |
| --- | --- |
| Water | 92.3 |
| Vinegar (10% solution) | 2.3 |
| Cooking salt | 2.0 |
| Sugar | 3.0 |
| Xanthan gum | 0.2 |
| Potassium sorbate | 0.1 |
| L-ascorbic acid | 0.1 |

Washed aubergines were cut into slices of about 7 mm thickness. The slices were pre-treated with olive oil and roasted in an oven at 240° C. for 90 seconds. The two sides of the slices were heated simultaneously. The hot roasted slices were cooled down immediately after the roasting process by immersing them into the marinade which was cooled to 5° C. The vegetables were soaked for 48 hours and the pH of the marinade was checked and justified at pH 4.3. Vegetables and marinade were packed into polyethylene bags. When heat-sealing the bags, it was ensured that the amount of entrapped air was kept at a minimum. The bags with marinade and aubergines were stored in a refrigerator at about 5° C. After 14 days the marinade was removed by sieving and the aubergines were used for assembling sandwiches. The taste and appearance of the vegetable matter was as good as at the time of immersing the roasted aubergines in the preserving liquid.

The invention claimed is:

1. A method for preserving vegetables comprising the steps:

subjecting the vegetables to a heat treatment chosen from the group consisting of shallow frying, deep frying, roasting, IR heating, UV heating and baking or grilling in hot air, contacting the heat-treated vegetables with a preserving liquid, storing the vegetables with the preserving liquid until use, where the preserving liquid is an aqueous solution containing a preservative agent, an antioxidant, 1.5-2.5 wt. % of cooking salt, up to 10% of a sweetener and such amount of an edible acid that the pH of the liquid after 48 hours of equilibration with the immersed vegetables is in the range 4.3-4.4; and wherein the weight of vegetables stored in the preserving liquid to the weight of the preserving liquid is chosen in the range from 1:1.4 to 1:1.8.

2. A method according to claim 1 where the vegetables are selected from the group consisting of aubergines, courgettes, peppers, carrots, onions, mushrooms and garlic.

3. A method according to claim 1 where the heat treatment is followed by immersing the still hot vegetables in the preserving liquid.

4. A method according to claim 1 where the preserving liquid has a temperature above freezing point and up to 30° C.

5. A composition comprising heat-treated vegetables in contact with a preserving liquid, where the weight ratio of vegetables to liquid is in the range 1.4 to 1:1.8, wherein the liquid comprises water, 1.5-2.5 wt. % of cooking salt, to 10% of a sweetener, an edible acid, an antioxidant, a preservative agent and has a pH in the range 4.3-4.4 after equilibration of 48 hours with the immersed vegetables and in that the heat treatment is chosen from the group consisting of shallow frying, deep frying, roasting, IR heating, UV heating and baking or grilling in hot air.

6. A composition according to claim 5 where the heat-treated vegetables are selected from the group consisting of courgettes, aubergines, carrots, onions, garlic, mushrooms and peppers.

* * * * *